March 7, 1967 A. W. LOHMANN 3,307,897

LIGHT MODULATOR

Filed July 1, 1963

INVENTOR.
ADOLF W. LOHMANN

BY

Elmer Galbi

ATTORNEY

United States Patent Office 3,307,897
Patented Mar. 7, 1967

3,307,897
LIGHT MODULATOR

Adolf W. Lohmann, San Jose, Calif., assignor to International Business Machines Corporation, New York, N.Y., a corporation of New York Filed July 1, 1963, Ser. No. 292,035
1 Claim. (Cl. 350—160)

This invention relates to optical systems and more particularly to a device for modulating light.

Recently, a great deal of effort has been expended in developing improved sources of coherent light such as lasers. However, in order to apply optical technology in the fields of data communication and data processing, one must have a practical device for modulating a beam of light, that is, one must have a practical light valve.

Light modulating devices such as Kerr cells and various electromechanical devices are known in the prior art. However, the known devices have severe disadvantages. For example, Kerr cells require high voltages and the response curve of Kerr cells is relatively smooth. Electromechanical devices have the disadvantage that they are only operable at relatively low frequencies.

It is well known that light traveling in one media will be totally reflected at the boundary between the first media and a second media if the index of refraction of the two media is sufficiently different and if the angle of incidence is greater than a certain critical angle. It is also known that a fringing field is generated when light traveling in a first media is totally reflected at a boundary between the first medium and a second medium. The fringing field is located in the second medium and it has a width (i.e., thickness) equal to several wavelengths of the incident light. When the fringing field is distrubed (e.g., by placing an object in the fringing field), the total reflection is "frustrated" and some of the light is not reflected at the boundary between the first medium and the second medium. The above-described phenomena which is generally termed frustrated total reflection is the analog of the tunnel effect of electrons emerging from an oxide cathode and of alpha particles emerging from a radioactive nucleus. The electronomagnetic waves which comprise the fringing field are generally termed "evanescent" waves.

A device which uses the phenomena of frustrated total reflection to modulate light is described in U.S. Patent 2,565,514, "Radiation Intensity Modulator" by Wolfe S. Pajes. This patent describes a device wherein the separation between a first element and a second element is controlled by a piezoelectric crystal. The second element is placed in the fringing field generated by light which would be totally reflected at the boundary of the first element except for the presence of the second element. By mechanically moving the second element relative to the first element, the amount of frustration (i.e., the amount that the second element interferes with the infringing field) is changed thereby modulating the amount of light that is reflected at the boundary of the first element. The device described in the above patent depends upon mechanical motion and hence it is only operable at relatively low frequencies.

The present invention is directed to a device which utilizes the phenomena of frustrated total reflection but which does not depend on mechanical motion. Hence, the device of the present invention is operable at relatively high frequency. The device of the present invention includes a first element, a second element positioned within several wavelengths of the first element and an electro-optic fluid between the two elements. By applying an electrical field to the electro-optic fluid, the refractive index thereof is changed. Light is directed into the first element so that it strikes the boundary between the first element and the electro-optic fluid at an angle which is greater than the critical angle both when an electrical field is applied to electro-optic fluid and when no electric field is applied thereto. If there were no frustration of the fringing field, total reflection would occur; however, the second element interferes with the fringing field thereby causing fristrated total reflection at the boundary of the first element. Changing the index of refraction of the fluid changes the amount of frustration thereby modulating the amount of light reflected at the boundary of the first element and likewise modulating the amount of light which passes through the first element to the second element.

An object of the present invention is to provide an improved light modulator.

Another object of the present invention is to provide a light modulator operable at high frequencies.

Still another object of the present invention is to provide a light modulator which has a sharp threshold.

A still further object of the present invention is to provide a low cost device for modulating light signals.

Yet another object of the present invention is to provide a light modulator which operates without mechanical motion and which has a sharp threshold .

The foregoing and other objects, features and advantages of the invention will be apparent from the following more particular description of preferred embodiments of the invention, as illustrated in the accompanying drawings.

Figure 1:
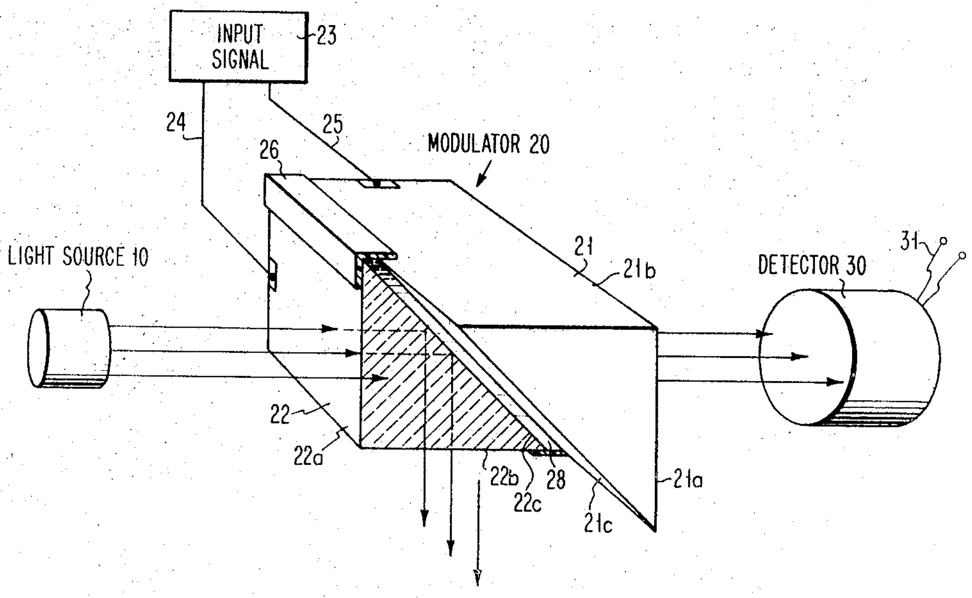
FIGURE 1 is a schematic diagram of a preferred embodiment of the present invention.
Figure 2:
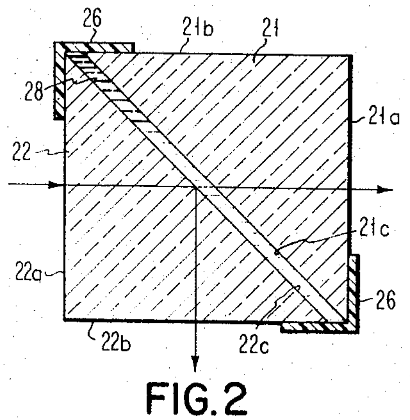
FIGURE 2 is a cross-sectional view of the device shown in FIGURE 1.

The first preferred embodiment as shown in FIGURE 1 includes a light source 10, a modulator 20, a signal input 23, and a detector 30. Light is transmitted from light source 10 through modulator 20 to detector 30. The transmissivity of modulator 20 is controlled by signals from input 23, hence, the amount of light reaching detector 30 and the output therefrom is controlled by the signals from input 23.

Modulator 20 includes two prisms 21 and 22 separated by a very thin layer of fluid 28. The layer of fluid 28 is one-half micron thick (i.e., prisms 21 and 22 are separated by a distance equal to several wavelengths of the incident light). Fluid 28 is restrained between prisms 21 and 22 by gasket 26. Fluid 28 is an electro-optic fluid which has the property that its index of refraction is changed when it is subject to an electrical field. Such fluids are well known and fluid 28 may, for example, be nitrobenzol. Prisms 21 and 22 are made of glass which is electrically conductive. When input 23 applies a voltage to lines 24 and 25, and electric field is generated between prisms 21 and 22 thereby subjecting fluid 28 to an electric field which changes its index of refraction. The manner that the transmissivity of detector 20 is changed when the index of refraction of fluid 28 is changed will now be explained with reference to FIGURE 3.

Figure 3:
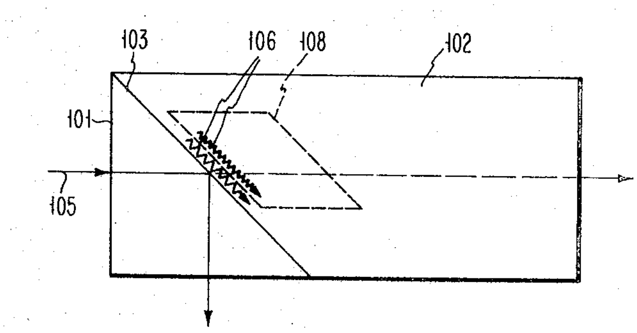
FIGURE 3 is a schematic diagram used to explain the operation of the modulator shown in FIGURES 1 and 2.

FIGURE 3 shows a prism 101 positioned next to an element 102. Prism 101 and element 102 are in contact along the surface designated 103. The dotted line 108 merely designates a specific part of element 102. The amount of reflection at surface 103 is dependent upon the angle of incidence and upon the relative magnitudes of the indices of refraction of prism 101 and element 102. As is also well known for angles of incidence greater than a certain critical angle, all of the light is reflected. More specifically, total reflection occurs if the sine of the angle of incidence is greater than $N2/N1$, where N1 and N2 are respectively the indices of refraction of prism 101 and element 102. The index of refraction of prism 101 and of element 102 and the orientation of surface 103 is such that light transmitted into prism 101 along path 105 is totally reflected at surface 103.

The fringing field (i.e., the evanescent waves) generated in medium 102 as illustrated in FIGURE 3 by the arrows designated 106. For light of a particular wavelength, the fringing field extends into element 102 to a depth equal to several wavelengths. The amount of reflection at surface 103 may be changed by interfering with fringing field 106. The interference may, for example, be achieved by replacing that portion of element 102 which is designated 108 with an object having different electrical characteristics. The intensity of fringing field 106 in area 108 is dependent upon the index of refraction of element 102. Hence, the effect of replacing area 108 with different material (i.e., the amount of interference with fringing field 106) is dependent upon the index of refraction of element 102.

The operation of modulator 20 will now be explained in detail. Prism 21 has three faces respectively designated 21*a*, 21*b*, and 21*c* and likewise prism 22 has three faces respectively designated 22*a*, 22*b* and 22*c*. Light waves in the visible and infrared frequency ranges are generated by source 10. These light waves pass through face 22*a* and they are thereafter internally incident upon face 22*c*. The angle of incidence of the light from source 10 upon face 22*c* is such that the angle of incidence is greater than the critical angle irrespective of whether or not there is a voltage applied between the prisms. That is, both when a voltage is present between the prisms and when no voltage is present between the prisms, the light from source 10 would be totally reflected at surface 22*c* if prism 21 were not present.

The light incident upon face 22*c* generates a fringing field which extends through electro-optic fluid 28 into prism 21. The intensity of the fringing field which extends into prism 21 is dependent upon the index of refraction of fluid 28. The index of refraction of fluid 28 can be changed by signals applied to lines 24 and 25. Changing the index of refraction of material 28 changes the amount that the fringing field penetrates into prism 21 thereby changing the amount of interference with this field due to prism 21. That is, changing the refractive index of fluid 28 changes the amount of frustration of the fringing field thereby changing the amount of reflection at surface 22*c*.

Herein detector 30 is positioned to detect the light which passes through both prisms 21 and 22. Alternately, detector 30 could be positioned beneath prism 21 to detect the reflected light. It should be understood that when the term transmissivity is used herein, it relates both to light which passes through both prisms 21 and 22 and the light which merely passes through prism 21. The amount of light which passes through both prisms 21 and 22 is the logical complement of the light which merely passes through prism 21.

Herein elements 21 and 22 are shown as prisms. It should be understood that these elements may have any arbitrary shape. The advantage of using prisms is that the faces wherein light enters and leaves are planar thereby causing no distortion. Prisms 21 and 22 are made of a transparent conductive material. Alternately, prisms 21 and 22 could be made of material which is transparent and non-conducting. In this case, faces 21*c* and 22*c* would be coated with a transparent electrode whereby electric fields could be applied to electro-optic material 28.

The electro-optic fluid 28 may alternately be any of the various types of fluid that are used in Kerr cells such as ADP and KDP. Furthermore, electro-optic fluid 28 could be a material which has an index of refraction which is changed by applying a magnetic field thereto. In this case, signals from input 23 would be used to apply varying magnetic fields to fluid 28.

It should be noted that for convenience of illustration the thickness of layer 28 relative to the size of prisms 21 and 22 is shown greatly exaggerated. As previously stated, layer 21 is approximately one-half micron thick. Prisms 21 and 22, on the other hand, may be any convenient size, for example, they may be approximately two inches wide and two inches long.

Figure 4:
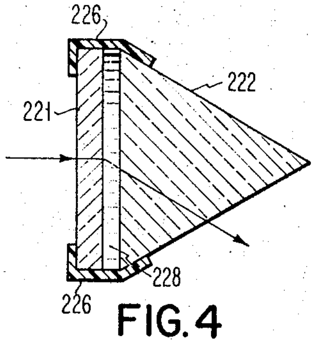
FIGURE 4 is a cross-sectional view of a second embodiment of the invention.

A second preferred embodiment of the invention is shown in FIGURE 4. In the first embodiment evanescent waves are generated by light which is incident upon surface 21*c* at an angle greater than the critical angle. In the second embodiment evanescent waves are generated by means of a diffraction grating. It is well known that evanescent waves may be generated by light passing through a diffraction grating. For example, see page 225, Electromagnetic Waves by G. Toraldo di Francia, Interscience Publishers, Inc., New York, 1956. In the second embodiment evanescent waves generated by light passing through a diffraction grating are converted to planar waves similar to the manner that the evanescent waves generated by means of a prism were converted to planar waves in the first embodiment.

The second embodiment includes a diffraction grating 221, electro-optic fluid 228, a prism 222 and a gasket 226. The surface of diffraction grating 221 which is in contact with electro-optic fluid 228 is coated with a transparent conductive layer (not explicitly shown in the drawings) and prism 222 is fabricated from a transparent conducted material. Thus, electric fields can be applied to electro-optic fluid 228 in order to change its index of refraction similar to the manner that this is done in the first embodiment.

As in the first embodiment the amount of energy which is transferred through electro-optic fluid 128 in the form of evanescent waves and which is transformed into planar waves in prism 122 is dependent upon the index of refraction of layer 228 which is in turn dependent upon the electrical field which is applied thereto. When the evanescent waves are generated by means of a diffraction grating as shown in FIGURE 4, some light will also pass through layer 228 in the form of a planar wave; however, it is well known that a diffraction grating can be designed so that a major portion of the light incident thereon is transferred into evanescent waves. In order to achieve a high degree of control over the amount of light transmitted, it is desirable that grating 221 be designed and positioned so that a major portion of the energy is transferred into evanescent waves.

While the invention has been particularly shown and described with reference to preferred embodiments thereof, it will be understood by those skilled in the art that the foregoing and other changes in the form and details may be made therein without departing from the spirit and scope of the invention.

What is claimed is:

A light modulating device comprising, a diffraction grating, a transparent element juxtaposed to said diffraction grating, said diffraction grating and said element being separated by several thousand angstroms whereby a fringing field extends into said transparent element when light is incident on said diffraction grating, an electro-optic element filling the same between said diffraction grating and said transparent element, said electro-optic element having an index of refraction which changes in response to the electrical field applied thereto, and means for applying an electric field to said electro-optic element thereby changing its index of refraction, whereby the total transmissivity of said device is changed when said electric field is applied to said electro-optic element.

References Cited by the Examiner

UNITED STATES PATENTS

| | | | |
|---|---|---|---|
| 2,997,922 | 8/1961 | Kaprelian | 88—61 |
| 3,177,759 | 4/1965 | Wilks | 88—14 |
| 3,208,342 | 9/1965 | Nethercot | 88—61 |

References Cited by the Applicant

UNITED STATES PATENTS

| | | |
|---|---|---|
| 1,877,744 | 9/1932 | Gardner. |
| 2,155,661 | 4/1939 | Jeffree. |
| 2,565,514 | 8/1951 | Pajes. |
| 3,035,491 | 5/1962 | Rosenthal et al. |

JEWELL H. PEDERSEN, *Primary Examiner.*

E. S. BAUER, *Assistant Examiner.*